(No Model.) 2 Sheets—Sheet 1.
S. B. SMITH.
COMBINED HARROW, PLANTER, AND ROLLER ATTACHMENT FOR PLOWS.
No. 391,204. Patented Oct. 16, 1888.
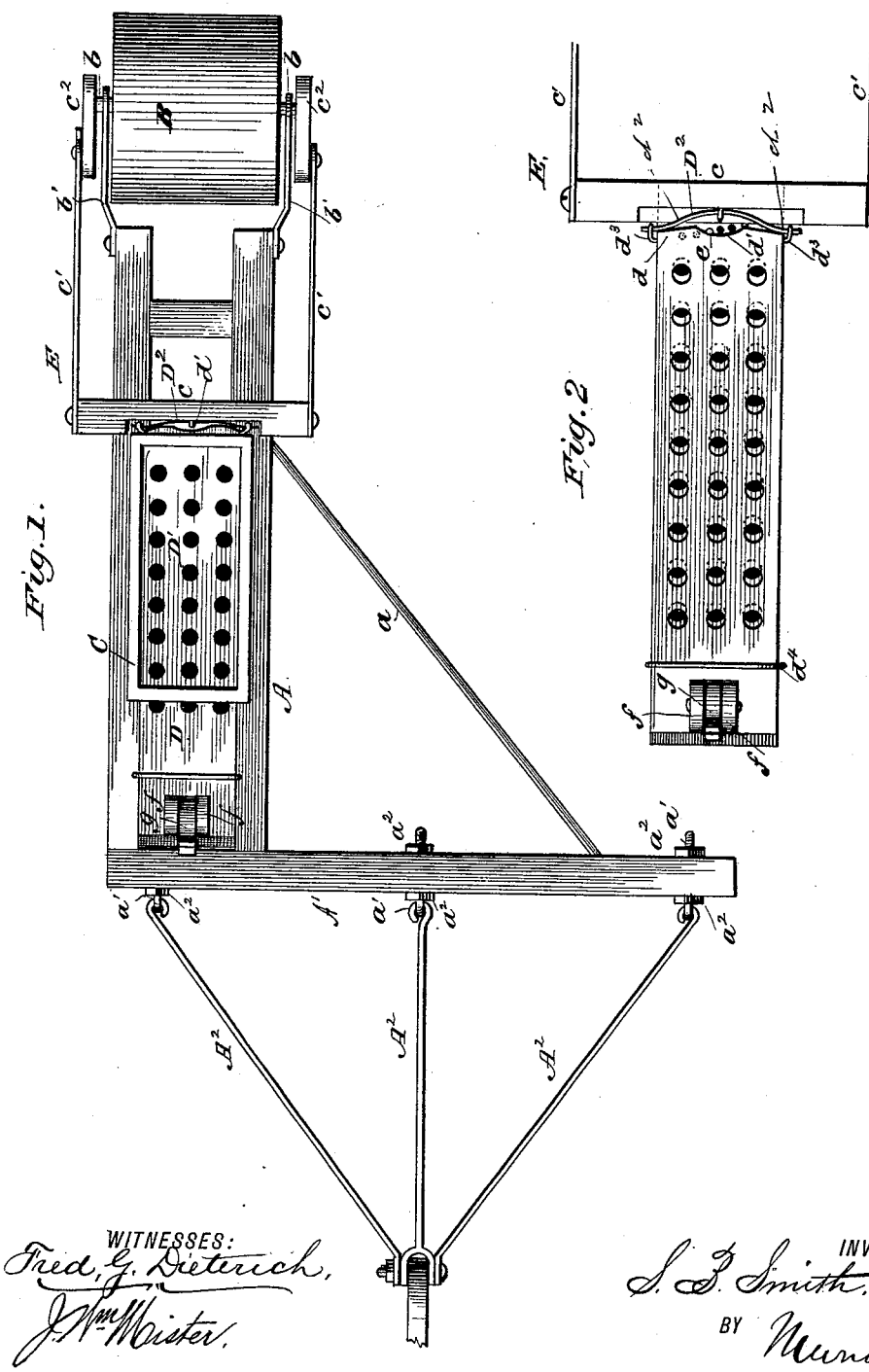

(No Model.) 2 Sheets—Sheet 2.
S. B. SMITH.
COMBINED HARROW, PLANTER, AND ROLLER ATTACHMENT FOR PLOWS.
No. 391,204. Patented Oct. 16, 1888.
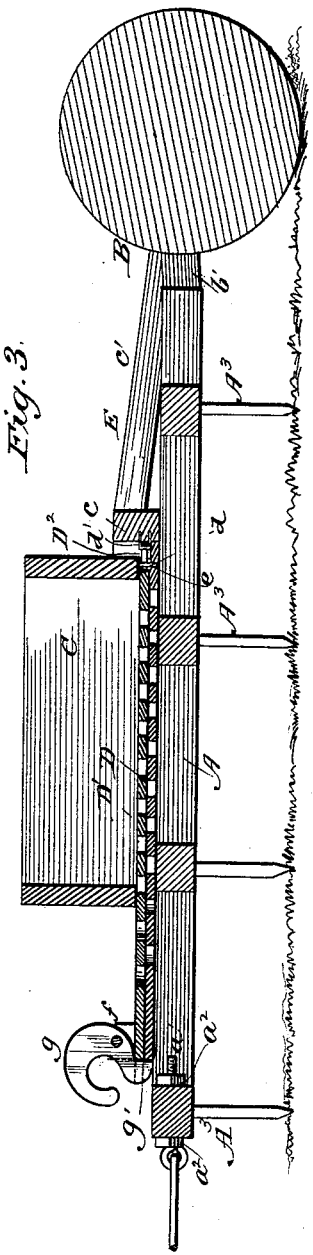
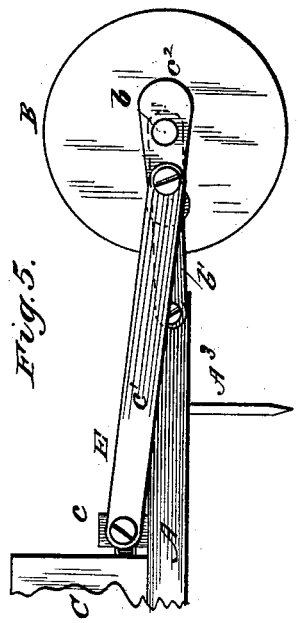
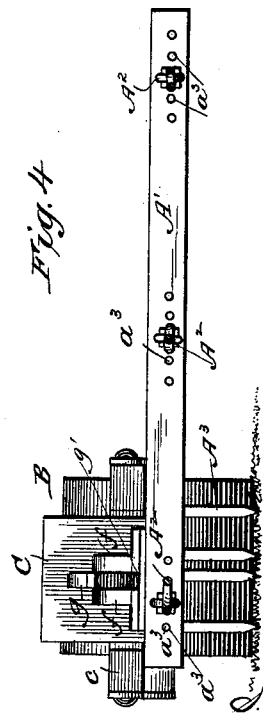
WITNESSES:
Fred G. Dieterich
J. W. Meister
INVENTOR,
S. B. Smith
BY
Munn & Co
ATTORNEY.

UNITED STATES PATENT OFFICE.

SAMUEL B. SMITH, OF SALT LAKE CITY, UTAH TERRITORY.

COMBINED HARROW, PLANTER, AND ROLLER ATTACHMENT FOR PLOWS.

SPECIFICATION forming part of Letters Patent No. 391,204, dated October 16, 1888.

Application filed April 12, 1888. Serial No. 270,507. (No model.)

*To all whom it may concern:*

Be it known that I, SAMUEL BAILEY SMITH, of Salt Lake City, in the county of Salt Lake, Utah Territory, have invented a new and useful Improvement in Combined Harrow, Planter, and Roller Attachments for Plows, of which the following is a specification.

This invention contemplates certain improvements in combined harrow, planter, and roller attachments for plows, having principally for its object to conduct the planting operation or dropping of the seed, together with the pulverizing of the upturned soil, carrying with it the covering of the deposited seed and rolling the pulverized soil, involving the working of the seed, all conducted simultaneously with the plowing operation in an expeditious manner.

The invention has in view also to readily put the planter or dropper in or out of operation, to adapt the planter to drop various-sized seeds, to readily bring the action of the dropping-slides under the control of the operator or driver, and to effect the adjustment of the draft-connection between the attachment and the plow.

The nature of the invention consists of a roller applied to the rear end of the seed-box carrying-frame and adapted to actuate the seed-slides, which frame is provided upon its under side with a series of harrow-teeth, of two perforated or foraminated slides adapted to be adjusted with relation to each other, varying the size of their openings, the adjustment being effected by a bolt fitting in the coincident ones of two series of apertures ranging obliquely in and transversely to the length of the two slides, of means for so adjusting the slides that their apertures shall or shall not register, and of an adjustably-applied draft-connection between the attachment and plow, substantially as hereinafter more fully set forth and claimed.

In the accompanying drawings, Figure 1 is a plan view of my improved combined harrow, planter, and roller attachment for plows. Fig. 2 is an enlarged detail view thereof. Fig. 3 is a sectional elevation of the same, and Figs. 4 and 5 are also enlarged detail views thereof.

In carrying out my invention I employ a frame, A, which has a series of harrow-teeth, $A^3 A^3$, pendent from its under side, forming the harrow, which teeth are arranged in rows of two teeth each, each successive row being out of alignment, thus causing the individual teeth of said rows to range or stand intermediately of each other, and accordingly affect the ground, as is desired, in order to secure the thorough and effective harrowing or pulverizing of the soil previously upturned by the plow. The forward or front end cross-bar, A', of the frame A is formed with an extension, which is suitably braced in position by means of a rod, $a$, connecting with said frame some distance back of its forward end and with said extension at its outer free end.

$A^2 A^2 A^2$ are three rods, which form the means of effecting the connection between the frame A and the plow for applying the draft thereto. The rear ends of said rods are connected to elongated bolts $a' a'$, adapted to pass through the extended cross-bar A' of said frame, each being provided with nuts $a^2 a^2$— one applied to the front side and the other applied to the rear side of the said bar—whereby the adjustment may be so affected as to dispose the said extended bar, together with the frame obliquely to the line of draft to vary or extend the path or direction of movement of the harrow-teeth. The extended bar A' is also provided with three groups or series of apertures, $a^3 a^3 a^3$, one being at or near each end of the said bar, while the remaining group or series is arranged intermediately of the other groups, whereby the three rods $A^2 A^2 A^2$ may be brought closer together or disposed farther apart, as may be desired, in varying the application of the draft. The forward ends of these rods $A^2 A^2 A^2$ are loosely connected together and adapted for connection or attachment to the rear end of the plow-beam.

B is the roller applied to the rear end of the frame A, having its axes $b b$ let into the outer or rear ends of side plates or arms, $b' b'$, the opposite or inner ends of which latter are connected to the outer sides at the rear ends of the side bars of the frame A.

C is the seed-box or hopper secured upon the frame A, and of which the bottom is formed of two foraminated or serially-perforated slides, D D', one being disposed so as to rest upon the side bars of the said frame, while the other rests upon and is carried by the one just mentioned, both, however, extending or projecting beyond the seed box or hopper at both ends. The lower slide, D, is connected at its rear end to the cross-bar $c$ of a frame, E, of which the side bars, $c'\ c'$, are pivotally connected to said cross-bar at their forward ends, while their rear ends are pivoted or connected to crank-arms $c^2$, secured to the ends of the axes $b\ b$ of the roller B. This arrangement permits of the actuation of or transmittal of motion from the roller to the seed-slides D D', in order to effect the operation of planting or dropping the seed, which, it will be seen, is performed or carried on simultaneously with the plowing or upturning of the soil, the harrowing or pulverizing thereof involving the covering of the deposited seed and the rolling of the soil, effecting the working of the seed, all thus being conducted by virtually one continuous operation.

In one (the rear) end of the slide D is a series of adjusting-apertures, $d\ d$, ranging obliquely in and transversely to the length of the slide, while the same end of the slide, D', is provided with a notch or recess, $d'$, which receives an adjusting-pin, $e$, inserted in one of the apertures $d\ d$, the purpose of which will appear farther on.

Between the cross-bar $c$ of frame E and the slide D' are interposed the two leaves $d^2\ d^2$ of a virtually single spring, $D^2$, the inner lapping ends of said leaves of the spring being secured in place by a staple receiving the same and driven into the cross-bar $c$. The leaves $d^2$ of the spring are bowed outward from the cross-bar $c$, and passed through eyes or staples $d^3$, projecting from the corners of the rear end of the slide D', thus effecting a connection between the spring $D^2$ and the said slide. The slide D' is held and guided in its movement, as presently described, by means of a bail or keeper, $d^4$, the ends of which enter or take into the side edges of the slide D, while through said keeper or bail bodily passes the slide D'.

It will now be seen, if it be required to vary the size or dropping capacity of the seed-apertures in the slides D D', that by pulling or forcing the slide D' forward and adjusting the pin $e$ to the required one of the apertures $d\ d$, according to the size it is desired to impart to the seed-apertures, and then letting go of the slide D', the pin $e$ will be received into the recess or notch $d'$ of the slide D', carried back by the action of the spring, and thus hold the said slide at the desired point of adjustment against the action of the spring $D^2$, effecting the result as above noted.

At the forward end of the upper slide, D', between studs or ears $f$ thereon, is pivoted or hung a latch, $g$, which is adapted at its lower side or edge to pass through a slot or notch, $g'$, in the forward edge or end of said slide and at its lower forward edge to engage with the forward edge of the lower slide, D, and effect the locking or holding together of the two slides.

In order to effect the connection between the parts just described, it is necessary to move the upper slide, D', so as to bring its forward end or edge in alignment with that end of the lower slide, D, by which movement the apertures of the slides will be moved entirely out of register with each other, and thus have the effect to wholly prevent the dropping or planting of the seed contained in the seed box or hopper.

In the upper forward edge or part of the latch $g$ is an open-ended slot to receive one end and permit of the connection therewith of any improvised contrivance or means—as, for instance, a rod or bar—whereby, with its outer or opposite end grasped by the attendant or operator, the aforesaid movement or adjustment of the upper slide, D', may be conveniently effected, as may also the reverse movement of said upper slide, which would in the latter case permit of the dropping of the seed.

It will be remarked that instead of disposing the harrow-teeth $A^3\ A^3$ in rows a single tooth may take the place of each row, while the same order otherwise as to the arrangement of the single teeth will be observed as followed in relatively disposing the rows of teeth.

Having thus fully described my invention, what I claim, and desire to secure by Letters Patent, is—

1. The attachment for plows, comprising a harrow consisting of a frame provided with teeth upon its under side and carrying upon its upper side a seed-box, and the roller actuating one of the seed-slides, substantially as set forth.

2. In an attachment for plows, the combination, with a seed-slide, of an additional seed-slide provided with a series of apertures ranging obliquely in and transversely to the length of the slide and a pin or bolt adjustable to any one of said apertures, substantially as set forth.

3. In an attachment for plows, the combination, with a seed-slide, of an additional seed-slide having a series of obliquely-ranging apertures, an adjusting pin or bolt, and a spring interposed between said additional slide and a cross-bar upon the first-named slide, substantially as set forth.

4. In an attachment for plows, the combination, with the seed-slide, of an additional seed-slide having a latch catching upon and holding the one slide to the other, substantially as specified.

5. In an attachment for plows, the combination, with the seed-slide, of an additional seed-slide having a hooked latch provided with an open slot in its upper part, while its lower part passes through a notch in the first-referred-to slide and engages with the forward edge of the last-referred-to slide, substantially as and for the purpose set forth.

SAMUEL B. SMITH.

Witnesses:
JAMES E. FULTON,
JAMES M. SMITH.